United States Patent [19]
Carner, Jr.

[11] Patent Number: 4,777,360
[45] Date of Patent: Oct. 11, 1988

[54] UMBRA/PENUMBRA DETECTOR

[76] Inventor: Don C. Carner, Jr., 132 Eagle Rock Ave., Channel Islands, Calif. 93035

[21] Appl. No.: 933,872

[22] Filed: Nov. 24, 1986

[51] Int. Cl.⁴ .............................................. G01D 5/34
[52] U.S. Cl. .................. 250/231 R; 356/375
[58] Field of Search ............... 250/203 R, 203 S, 578, 250/573, 576, 231 R; 356/152, 141, 39, 375; 33/269, 270, 271; 364/559; 382/41, 45, 25, 28

[56] References Cited

U.S. PATENT DOCUMENTS

| 31,143 | 2/1883 | Kaye et al. | 356/381 |
|---|---|---|---|
| 4,008,391 | 2/1977 | Henderson, Jr. | 250/208 |
| 4,019,173 | 4/1977 | Kono | 382/28 |
| 4,105,925 | 8/1978 | Rossol et al. | 250/561 |
| 4,281,342 | 7/1981 | Ueda et al. | 356/559 |
| 4,335,962 | 6/1982 | DiMatteo et al. | 356/376 |
| 4,435,837 | 3/1984 | Abernathy | 356/375 |
| 4,522,494 | 6/1985 | Bonner | 356/39 |
| 4,574,199 | 3/1986 | Pryor | 250/561 |

Primary Examiner—David C. Nelms
Assistant Examiner—Jessie Ruoff
Attorney, Agent, or Firm—Leonard Bloom

[57] ABSTRACT

A device which monitors the characteristics of an image cast upon a radiation sensitive substrate. This includes a shadow casting object or mask and at least one source of radiation disposed above the object or mask so that the image cast on the substrate can be analyzed.

23 Claims, 3 Drawing Sheets

UMBRA/PENUMBRA DETECTOR

This invention was made with Government support under Subcontracts 4525410 and 4527510 under Contract No. DE-AC03-76SF00098 awarded by the Department of Energy. The Government has certain rights in this invention.

FIELD OF THE INVENTION

The following invention relates to an imaging detector which preserves information relating the spatial distribution of plural radiation sources without the use of lenses.

BACKGROUND OF THE INVENTION

Detectors for measuring visible light and other radiation generally fall into categories of imaging and non-imaging. The differences in complexity, technique and consequent cost of these two measurement types is significant.

A typical non-imaging detector is a conventional photographic light meter. Non-imaging radiation detectors integrate the amount of radiation falling on a sensing plane. Generally, non-imaging sensors do not discern the spatial orientation of contributing radiation sources.

Examples of imaging detectors are television and photographic cameras. The primary benefit of an imaging detection system rests in the detailed spatially succinct information which is produced through the use of auxiliary optical systems. Preservation of the spatial orientation of various light sources produces a far richer and more detailed description of the radiation phenomena.

Ancillary optical systems, however, heretofore required for imaging, still represent a major fixed cost of an imaging system. In addition optical imaging systems introduce geometric and luminance distortions of source radiation.

The following patents reflect the state of the art of which applicant is aware insofar as they appear germaine to the process at hand and to discharge the duty to disclose prior art:

| | | |
|---|---|---|
| 31,143 | Kaye, deceased et al | Feb. 8, 1983 |
| 4,105,925 | Rossol, et al | Aug. 8, 1978 |
| 4,008,391 | Henderson, Jr. | Feb. 15, 1977 |
| 4,335,962 | DiMatteo, et al | Jun. 22, 1982 |

SUMMARY OF THE INVENTION

The current invention uses a novel technique to preserve information relating to the spatial distribution of radiation sources in a four dimensional environment without the use of lenses. Moreover it describes how such lens-less imaging can be adapted to a wide range of practical applications from light measurement to refractometry to celestial navigation to blood analysis.

Inexpensive array detectors such as an "optical RAM" (for example Micron Technology's IS32) which are essentially binary photodetectors, or more complex array detectors such as Charge Coupled Devices (CCD) or Charge Injection Devices (CID) can reduce the cost of an imaging radiation detection system.

The instant invention is a lens-less, direct contact or "shadow casting" imaging system which is used in conjunction with any image sensing substrate including, but not limited to: photographic film, electronic imaging arrays or other radiation sensitive substrates. It provides a means by which 2, 3, and 4 dimensional data representations can be made of any environment where radiation is present.

OBJECTS OF THE INVENTION

A principal objective of the present invention is to provide a means for recording attributes of a radiant source or sources in a hemispherical environment onto an electronic sensing array without the use of typical optical components such as lenses, mirrors, prisms, or any combination of these elements.

A second objective of the instant invention is to describe a system by which positional, quantity and quality data is translated to an electronic imaging array directly by placing an object to be imaged in close proximity to the array. Position, size, shape and other attributes are transferred to a sensing array by the shadow and/or partial transmission through the object of a radiation source.

A further objective is to provide a means of "imaging" various parameters such as inclination, gravity detection, magnetic field orientation, barometric pressure etc. by converting them into electrical states at various photosites thereby making them accessible to computer or Central Processing Unit manipulation for analysis.

A further objective is to provide a means for determining the spectral characteristics and or chromaticity of radiation sources by means of placing various filtering elements on top of the image sensing substrates. The selective occlusions of certain wave lengths when compared will thus provide further information on the characteristics of the radiation.

A further objective is to provide a means for a thin or liquid specimen, component, structure or cell analysis based on projected contact "images."

A further objective is to provide a means for the determination of geographical locations on earth by means of solar or lunar navigational techniques by derivation of celestial body location (altitude and azimuth) as a function of time.

A further objective is to provide a means for superimposing on an image sensitive substrate one or more compass, gravitational, celestial body altitude and azimuth, temperature, barometric pressure, and/or other similar indicators to be correlated to precise time measurement parameters for determining phenomena associated therewith specific to the indicator(s) chosen.

A further objective is to provide a means for superimposing on an image sensitive substrate the appropriate combination of compass, gravitational, and celestial body altitude and azimuth, temperature, barometric pressure, and/or other similar parameter measuring devices which are to be correlated to precise time measurement parameters for navigational purposes.

A further objective is to provide a means for superposition on a radiation sensitive substrate an appropriate combination of compass, gravitational, radiation blocking (shadow casting) material, and/or radiation filter materials in order to determine the location, size, brightness, chromaticity and other characteristics of radiation sources located in the hemisphere above the radiation sensitive substrate.

A further objective is to provide a means for using the above information from two or more such "shadow" images so that comparison can be made between plural radiative environments.

More particularly, a further object contemplates a device for observing phenomena through image casting comprising in combination:
a radiation sensitive substrate having means to be selectively exposed to a source of radiation thereabove, and image means interposed between said substrate and the radiation source whereby gradations form on said substrate in response to characteristics associated with said image means and the source of radiation, providing data on said substrate, said substrate embodied as a matrix having a plurality of nodes which are specific with respect to their address so that the data can be subsequently analyzed.

Furthermore, the device of the preceeding paragraph is realized wherein said image means is embodied as a sphere placed above said radiation sensitive substrate, so that a shadow cast by said sphere can be analyzed.

The device can also be realized where said image means comprises a sphere disposed in a transparent concave dish above said substrate, and said dish containing a viscous liquid which dampens the rate of roll of said sphere, and a lid on said dish containing said liquid in said concave dish whereby properties of said sphere in said liquid can be observed by said substrate.

Alternatively, the device can be realized wherein said image means is formed as a tube having a closed one end, compressable gas in said tube adjacent said closed end and an opaque fluid in said tube sealing said gas therein, defining a barometer whereby changes in atmospheric pressure causing said opaque liquid to move closer to said closed end can be sensed on said image sensing substrate.

As a further alternative, the device is constructed wherein said image means includes a magnetically sensitive needle carried within a dampening liquid and housed in a container which is transparent to radiation, said needle opaque to radiation and overlying said substrate to cast a shadow thereon.

Notwithstanding the foregoing, the device previously discussed is envisioned wherein said image means includes a specimen contained on a slide type plate interposed between the radiation source and said substrate.

A further object envisions the device previously discussed wherein said image means is embodied as a vertically extending opaque cylinder carried in a central depressed portion of a concave transparent dish whereby radiation emanating from a source near the horizon can cast a measurable shadow.

Alternatively, the device is characterized wherein a sphere is placed in a transparent concave dish, said sphere having on its outer surface defined areas of radiation absorption and reflection to alter the image cast on said substrate.

On the other hand, the device may be configured wherein said sphere is magnetically biased to orient one aspect thereof to north.

Additionally, the device may be embodied wherein said image means is an opaque mask having at least one aperture allowing radiation to pass therebeyond.

More particularly, the device of the preceeding paragraph may be characterized wherein said mask includes plural apertures and said mask has means to translate said mask over said substrate to selectively stimulate said substrate.

Alternatively, the device discussed earlier may be fashioned wherein refraction means are included with said image means to provide further information with respect to said radiation.

An object is also to provide a method for discerning physical characteristics of phenomena with a high degree of resolution comprising the steps of:
providing a radiation senstive substrate, superimposing thereupon an object which can form an image on said substrate, exposing both the object and the substrate to radiation to which the substrate is sensitive thereby creating an image on the substrate specific to the object placed thereabove, and interpreting the shadow upon said substrate by dividing the substrate into a plurality of specific addresses, each address having information which varies as a function of the relative presence or absence of the image cast as well as its gradations and as a function of time.

The previous paragraph can be realized wherein the method includes refreshing the addresses at discrete time intervals to reinitialize the substrate and noting the presence of the shadow as a function of time after refreshing the addresses.

The object of the previous paragraph may include forming the object as a sphere having areas of absorption of radiation and areas of reflection to provide additional information.

On the other hand, the method may include providing the object as an elongate cylinder placing liquid therein to expand and contract wiith variations in barometric pressure.

Alternatively, the method may include providing the object in a concave dish and first allowing the object to be placed at an extremity of the concave dish adjacent an edge thereof, reorienting the dish in a horizontal plane, and monitoring the object's passage to an at rest lower most position.

As a further alternative, the method may include the steps of embodying the object as a mask and providing at least one pin hole through which the radiation passes.

More particularly, the method may include segregating the substrate into a plurality of sectors and translating the mask so that a mask hole passes over small areas of each sector, and integrating the information received by the substrate as a function of mask motion, whereby the mask superimposes images on a given substrate sector with greater resolution of detail.

Independently the object may include a diagnostic instrument comprising in combination:
a source of radiation, an object to be diagnosed placed in the parth of the radiation emanating from the source, and sensing substrate means disposed on a side of the diagnosed object remote from the source of radiation and having a plurality of discrete addresses for providing resolution for the diagnosed object as a function of the degree to which the diagnosed object modifies the radiation received on said sensing substrate means, and means for reinitializing said sensing substrate means.

Other and further objectives of this invention will be apparent from the following description taken in conjunction with the drawing figures.

DESCRIPTION OF THE DRAWING FIGURES

Figure 14:
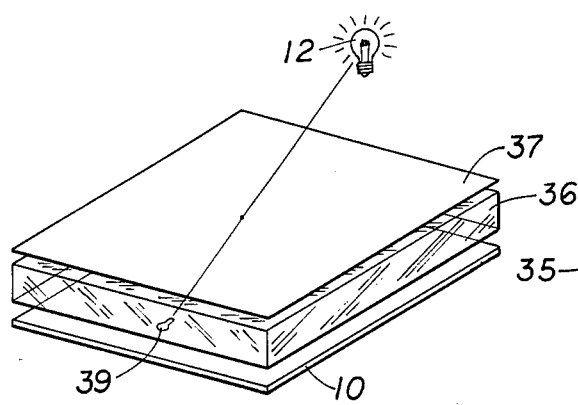
FIG. 14 is a perspective view of a different type of imaging technique.
Figure 15:
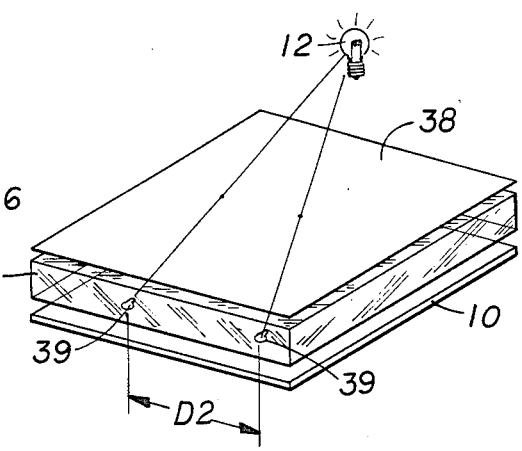
FIG. 15 is a variation on FIG. 14.
Figure 16:
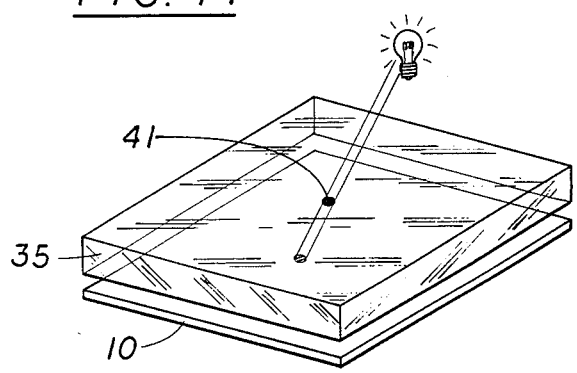

FIG. 16 reflects an imaging technique that does not use the pin hole selection of FIGS. 14 or 15, rather an opaque dot.

Figure 17:
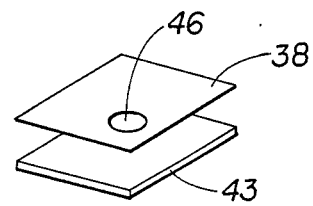

FIG. 17 is a perspective view of a masking technique consonant with FIGS. 14 through 16.

Figure 18:
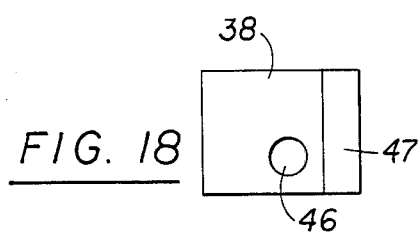

FIG. 18 is a top plan altered view of that which is shown in FIG. 17.

FIG. 19 shows some possible ways of orienting the mask of FIGS. 17 and 18.

Figure 9:
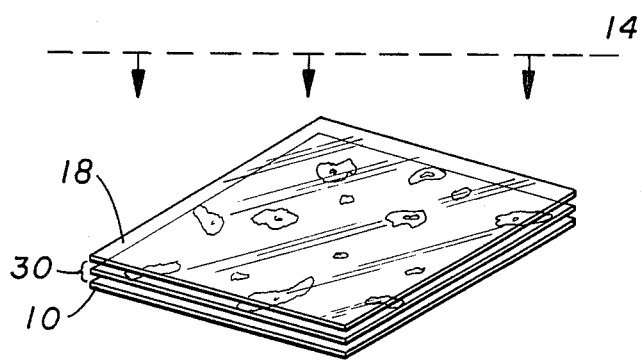
FIG. 9 is a perspective view of the device used for contact imaging.
Figure 20:
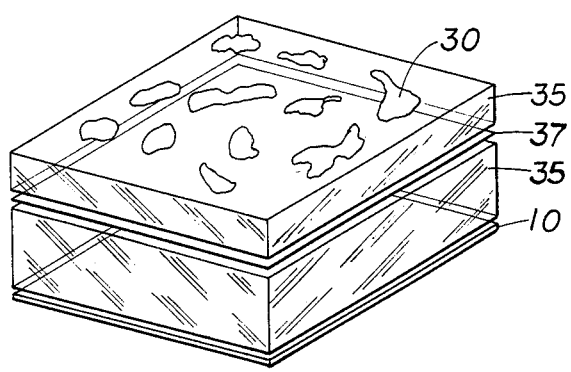

FIG. 20 shows an alternative of that which is shown in FIG. 9.

Figure 21:
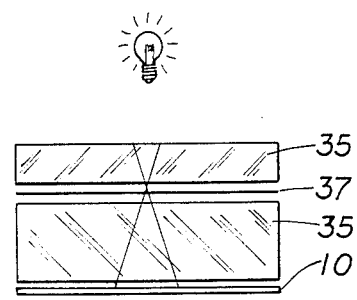

FIG. 21 is a side view of FIG. 20.

DETAILED DESCRIPTION OF THE PREFERRED EMBODIMENT

Figure 1:
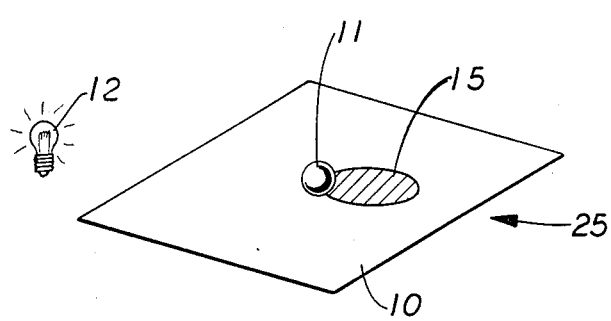
FIG. 1 is a perspective view of the apparatus schematically depicting the concept of the invention.

Referring now to FIG. 1, a device 25 has a shadow casting solid object 11 located in a known fixed position relative to a radiation sensitive substrate 10. A radiation source 12 illuminates the radiation sensitive substrate creating a shadow 15 of the solid object 11 on this substrate. The shape and orientation of the shadow can be used to determine the position and other attributes regarding the radiation source because the object 11 is in a known fixed position.

Figure 2:
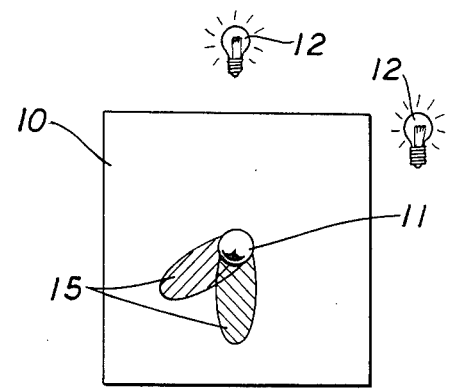
FIG. 2 is a top plan view of that which is shown in FIG. 1 with plural light sources.

Referring now to FIG. 2, two distinct radiation sources 12 are located above and casting distinct shadows 15 on the radiation sensing substrate 10. Note that the area where the two shadows 15 overlap will provide indicia distinct from from the shadows that are not overlapping, thereby providing further information. While light sources have been shown for illustrative purposes, additional light sources or other radiation sources could have been provided.

Figure 3:
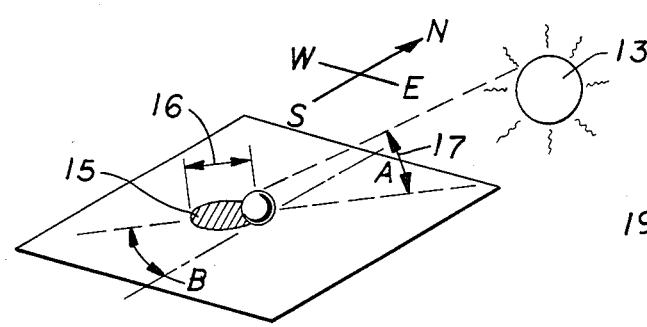
FIG. 3 is a perspective view similar to FIG. 1 showing the device particularly used for a form of navigation.

Referring now to FIG. 3, the shadow 15 is cast by a celestial radiant body 13. The maximum length 16 of the shadow cast defines the locale (azimuth) of the radiation source relative to object 11. Angle "B" is determined by bisecting the cast shadow 15 into two equal symmetrical halves and correlating this angle with a fixed reference, such as true north. It can be proven using basic concepts of geometry that there is a distinct relationship between radiation source 13, radiation sensing substrate 10 and the shadow cast by solid 11 by virtue of the resultant size, shape and orientation of the cast shadow 15. The angular relationship 17 between radiant body 13 and the length of the shadow 15 on substrate 10 can be found since the height (in this case the diameter) of body 11 is known. Thus, given accepted concepts of celestial navigation it is possible to deduce as a function of time, one's geographical location on the surface of the earth given celestial body altitude and azimuth at a known altitude above sea level.

Figure 4:
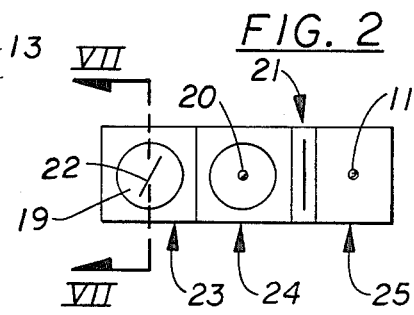
FIG. 4 is a top plan view depicting the apparatus in another environment.

Referring now to FIG. 4, a micro instrumentation package is depicted which includes a magnetic field sensing device 23, a gravitational field sensor 24, a barometer/altimeter 21, and a shadow casting sensor 25. This integrated package may be placed upon or in contact with a radiation sensing substrate 10, preferrably an electronic array sensor such as an optically sensitive random access memory (optic RAM), charge coupled device (CCD), charge injection device (CID), etc. Details of these components ensue.

Figure 5:
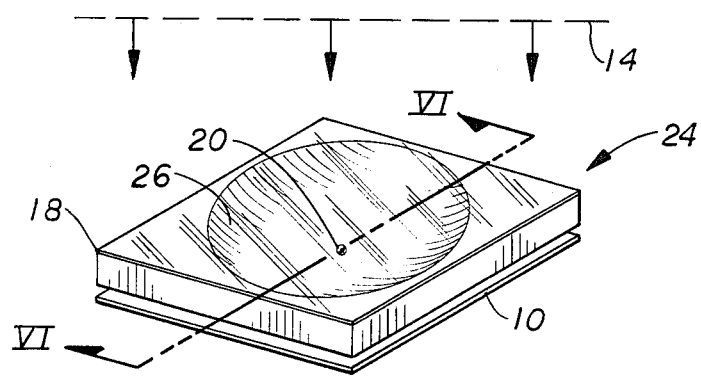
FIG. 5 is a perspective view of a motion sensing element.
Figure 6:
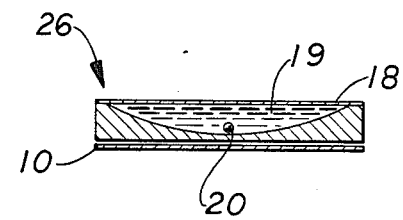
FIG. 6 is a sectional view taken along lines 6—6 of FIG. 5.

FIGS. 5 and 6 detail the workings of the gravity sensor 24. A small freely moving solid object such as a metallic sphere 20 is placed on a slightly concave and optically transparent base 26. The entire assembly is covered with a transparent cover plate 18 and placed above or in contact with a radiation sensing substrate 10. FIG. 6 includes a dampening fluid 19 which may be useful in lubricating and reducing the speed of travel of sphere 20. The size of sphere 20, characteristic of the fluid 19 (viscosity and specific gravity e.g.) the curvature of the concave base 26 and the resolution of the image sensing plane 10 are known and selected to provide the accuracy necessary for the particular application. Radiation passing through the transparent plate 18 and base 26 is blocked by the shadow casting sphere 20 and a shadow is cast on the radiation sensing substrate 10. The change of location of this shadow on the sensing substrate as a function of time and sphere motion can be used to determine the orientation of the sensor 24 relative to prevailing gravitational forces. One possible method of use is to tilt the sensor 24 until the sphere 20 nests between cover 18 and a top edge of concave base 26. Next, "initialize" the substrate 10 by performing a memory refresh cycle and orient the device 24 so that it is in a horizontal plane. Tracking the descent of sphere 20 will convert to the effect of gfavity in the absense of other forces of acceleration.

Substituting a fluid sphere having high surface tension, for example, mercury for solid object 20 produces a direct gravity sensor. As forces of gravity vary as a function of altitude above the earth, the shape of the fluid sphere changes. Thus, as the force of gravity increases the shape of the fluid sphere flattens. Conversely as the force of gravity decreases the fluid approximates a sphere. When the fluid sphere is concave base 26, it also functions as an inclinometer by coming to rest at the "lowest" point (artificial horizon) in the concave base as determined by the direction of the forces of gravity. It should be noted that such a sensor measures all forces acting upon it allowing it to measure all faces of acceleration.

Figure 7:
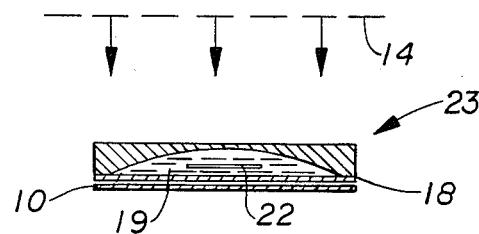
FIG. 7 is a sectional view taken along lines 7—7 of FIG. 4.

Refer now to FIG. 7 which describes the magnetic field sensor 23. A magnetically sensitive solid 22 rotates freely in the surrounding dampening medium 19 in a sealed enclosure formed by transparent element 26 (inverted when compared with FIG. 6) and substrate 10. As radiation 14 falls on the radiation sensitive substrate 10, it is blocked by the magnetically sensitive solid 22. The shadow cast on the radiation sensitive substrate 10 is an indicator of the magnetic field acting on solid 22 embodied as a needle. Thus, this sensor can serve as a compass.

Figure 8:
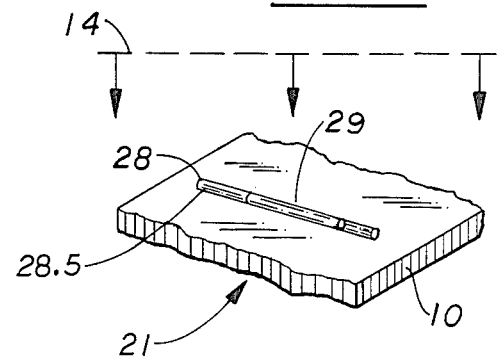
FIG. 8 is a perspective view of portion 21 shown in FIG. 4.

FIG. 8 describes an altimeter/barometric pressure sensor. A transparent capillary tube 28 is sealed on one end and open to the atmosphere on the other. A non volatile opaque liquid 29 is injected into the open end of the tube in such a way that a gas filled space 28.5 is preserved between the sealed end of the tube and the liquid. As atmospheric pressure changes the gas is compressed. Evaporation of the liquid 29 can be avoided with a pressure sensitive diaphram 28.7 capping this liquid in the tube 28. Radiation 14, falling on the radiation sensing substrate 10, is blocked by the opaque liquid 29, the position of which in the capillary tube is dependent on ambient pressure.

FIG. 9 depicts a contact imaging device. A transparent cover material 18, such as glass is placed above a radiation sensing substrate 10, such that a small gap is formed between the two. Into this gap specimens 30, can be placed or injected. Radiation 14 falling on the image sensing substrate is obstructed by the specimens 30. In this way key attributes of the sample may be imaged onto the radiation sensitive substrate 10. The resolution and structure of the substrate 10 can be selected to correspond to the sample being tested. For example blood analysis could be performed by selecting an image sensitive "grid" which so allows for sufficient resolution of individual cells that counts of red and white cells could be made as well as the presence of bacteria when placed in a growing medium. Cell abnormalities can be observed as well, quickly enhanced electronically using image processing techniques.

Figure 10:
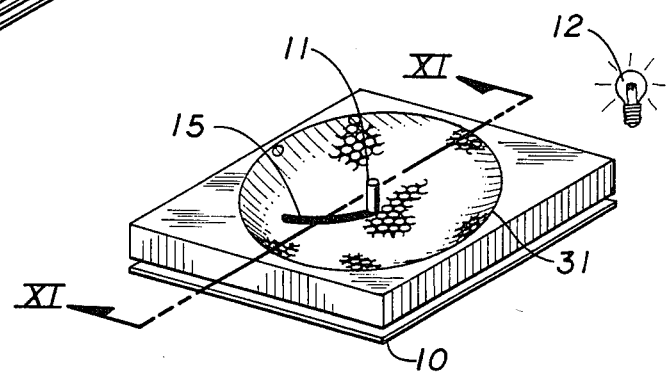
FIG. 10 is a perspective view of a device for sensing a shadow cast by low altitude radiation sources.
Figure 11:
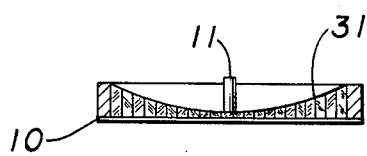
FIG. 11 is a sectional view taken along lines 11—11 of FIG. 10.

FIGS. 10 and 11 depict a shadow casting sensor for enhanced resolution of low altitude radiation sources. In this case parallel discrete light pipes 31, such as may be formed from commercially available fibre optics, are coherently bundled and ground slightly concave (FIG. 11). In this way shadows cast from radiation sources near the horizon cast a shadow of finite length on the concave coherent bundle or lights pipes 31 which is transferred to the sensing substrate 10. By having object 11 (embodied as an opaque cylinder) recessed in the concave bundle array, longer shadows (relative to a planar surface) can still be observed.

Figure 12:
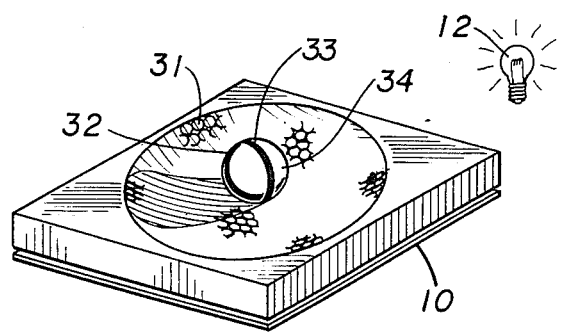
FIG. 12 is a perspective view of the apparatus for sensing gravitational fields, magnetic fields and a radiation source's altitude and azimuth.
Figure 12A:
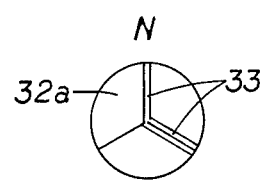
FIG. 12a is a top plan view of a second sphere useable in FIG. 12.

FIG. 12 describes a shadow casting sensor which combines measurement of gravitational field, magnetic field, and radiation source altitude and azimuth. In this case a magnetically sensitive sphere 32, is marked with a radiation absorbing stripe 33 and reflecting 34 patterns. The rate at which it comes to rest (like gravity sensor 24) onto a coherent concave light piping surface 31, the shadow then cast by the radiation source (like shadow cast device 25), as well as the final orientation of the absorbing stripe 33 of the magnetically sensitive sphere 32 (like compass needle 22c) are translated to the image sensing substrate 10 and processed for information obtainable thereby. FIG. 12a shows a second sphere 32a detailed for compass readings.

Figure 13:
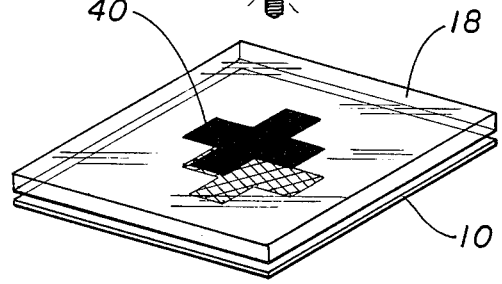
FIG. 13 is a perspective view of a cruciform shape object used with a sensor.

FIG. 13 describes a shadow casting sensor consisting of cruciform shaped opaque pattern 40 mounted on a transparent cover 18 such that radiation coming from source 12 passes through the transparent cover material to the sensing substrate 10 except in those places where it is blocked by pattern 40. By measuring the location of the shadow cast on substrate 10 it is possible to determine the altitude and azimuth of the radiation source.

A static mask 37, 38 may be substituted for the foregoing in which cast the image sensitive substrate 10 can be programmed and used as a Random Access Memory (RAM) device. By configuring the holes in the mask to a specific pattern representative of the desired binary configuration of memory, an exposure and readout can be made with the individual photosites set to a predetermined and repeatable "program". In this way programs written to perform a particular task can be "loaded" into computer memory and once optically imaged can be refreshed or erased just as a normal RAM.

FIG. 14 depicts a system which substitutes the object 20, 11 or the like with a mask 37 made of thin opaque material having a single pin hole thereon. As before, a source of radiation 12, when impinging on the hole in the mask 37, will pass through a spacer element 36 thereby casting an image 39 on the substrate 10 for analysis. The spacer element 36, having a thickness "T" is optically transparent, and may be hollow with air or a vacuum, glass, plastic, or some form of optical lense to achieve a desired effect. For example, element 36 may be a refractive lense for further radiation anaylsis as it refracts light.

FIG. 15 depicts a similar system, but the mask 38 is provided with a plurality of holes, illustratively shown in this case as two holes. As depicted, two images 39 of the light source 12 are provided on the substrate 10, and a distance D2 separating the two cast images provides triangulation information with respect to the light source 12. As with element 36, element 35 may be a lens, etc.

FIG. 16 reflects a further embodiment in which the optically transparent element 35 has no mask, but rather is provided with an opaque radiation blocking element 41 so that the source of illumination 12 will not be cast uniformly on the sensitive substrate 10.

FIG. 17 provides an image sensitive substrate 43 formed from plural distinct photosites (part of a large photosensitive array), with only one of many mask holes 46 shown here. The opaque mask 38 having mask holes 46 one hole for each respective quadrant on the substrate 43.

FIG. 18 contemplates providing means for translating the mask 38 in any of a plurality of directions using a known drive 47.

Figure 19A:
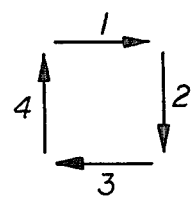
Figure 19B:
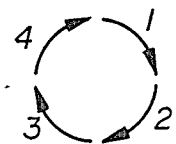

FIG. 19 suggests moving the mask in four different directions denoted by the arrows 1, 2, 3, 4, with FIG. 19a showing a linear rectangular pattern, and FIG. 19b a circular pattern. Any type of drive translational unit 47 can cause the motion for the mask 38 to provide the desired effect on the substrate 43. Specifically, the substrate 43 is "read" a plurality of times as the mask hole is moved along its quadrant. Integrating the series of readings provides more detailed, specific information at each quadrant since the quadrant is not over saturated with information (i.e. overcomes the substrate's "reading ability"). Actually, a quadrant can correspond to a pixil or a plurality of pixils on an optic RAM chip.

FIG. 20 reflects a modification for viewing specimens 30, somewhat similar to that which was shown in FIG. 9. A specimen plate 30 is placed atop an optically transparent element 35 and exposed to a source of illumination 14, with a thin opaque mask 37 interposed between an upper and lower transparent element 35 and ultimately onto the substrate 10. The presence of the specimen 30 and the way they react to the source of radiation 14 will be cast upon the substrate 10.

The sensing substrate 10 can include the following: A commercially available imaging grid type array is provided with a conventional Optic-Random Access Memory (Optic-RAM) integrated circuit coupled to an appropriate Central Processing Unit (CPU). Thus, it is possible to create a basic radiation sensitive substrate 10. Each discrete memory address of a silicon based RAM chip is sensitive to radiation in the ultra violet to visible light spectrum. During typical operation all memory addresses are refreshed or brought up to a designated voltage. Gradually the charge at each memory location falls off over time and must periodically be refreshed. When radiation in the UV to Visible spectrum falls on the exposed memory array the rate at which each memory site loses its charge is dependent on the intensity of radiation falling on it. If the memory array is scanned at some time after the refresh cycle those memory sites receiving greater radiation will have a lower charge than those receiving less radiation. The period of time that the memory array is allowed to be exposed to radiation can be varied as can the threshold voltage for determining the cut off value of reading a memory location as local 0 or 1. In this way during each refresh memory reading cycle a radiation sensitive binary data matrix or image can be established. If the geometrical layout of the RAM array is appropriate as is the case in Optic RAM then the image may be interpreted directly as photosites corresponding to light and dark areas falling on the array. If memory sites are of a different configuration or are read out of order, some manipulation of the data matrix may be necessary. An image data matrix may be manipulated in many different ways to achieve the required results. For example, if multiple "exposures" are made of a given radiant environment gradually changing the exposure time and then add each reading to the proceeding binary image, various levels of light and dark or "grey levels" can be discerned. Identical multiple exposures at the same sites can be made and added to one another to achieve improved data accuracy. Because the geometry of the radiation sensitive substrate 10 is fixed and stable it is possible to discern events happening above the array from the shadows of the radiation cast on the image sensitive substrate. Moreover, the information about the radiant environment or the shape of or micoscopic changes in the mechanical overlay above the array can be translated directly into binary, TTL compatible, CPU or computer accessible data.

I claim:

1. A device for observing phenomena through image casting comprisng in combination:
   a radiation sensitive substrate having means to be selectively exposed to a source of radiation thereabove,
   an image means interposed between said substrate and the radiation source whereby gradations form on said substrate in response to characteristics associated with said image means and the source of radiation, providing data on said substrate,
   said substrate embodied as a matrix having a plurality of nodes which are specific with respect to their addresses so that data can subsequently be analyzed, and wherein said image means is formed as a tube having a closed one end, compressible gas in said tube adjacent said closed end and an opaque fluid in said tube sealing said gas therein, defining a barometer whereby changes in atmospheric pressure causing said opaque fluid to move closer to said closed end can be sensed on said image sensing substrate.

2. A device for observing phenomena through image casting comprising in combination:
   a radiation sensitive substrate having means to be selectively exposed to a source of radiation above said substrate,
   an image means interposed between said substrate and the radiation source whereby gradations form on said substrate in response to characteristics associated with said image means and the source of radiation, providing data on said substrate,
   said substrate embodied as a matrix having a plurality of nodes which are specific with respect to their addresses so that data can subsequently be analyzed, and wherein said image means includes a magnetically sensitive needle carried within a dampening fluid and housed in a container which is transparent to radiation, said needle opaque to radiation and overlying said substrate to cast a shadow thereon whereby the phenomena being observed is magnetic north as a compass.

3. A device for observing phenomena through image casting comprising in combination:
   a radiation sensitive substrate having means to be selectively exposed to at least one source of radiation of unknown physical properties, particularly its orientation with respect to said substrate,
   an image means of known dimension and characteristic physical properties interposed between said substrate and the radiation source whereby gradations form on said substrate in response to the characteristics associated with said image means and the source of radiation, providing data on said substrate concerning characteristics of the radiation source,
   said substrate embodied as a matrix having a plurality of nodes which are specific with respect to their address so that the data can be subsequently analyzed.

4. A device for observing phenomena through image casting comprising in combination:
   a lens-less unfocused radiation sensitive substrate having means to be selectively exposed to a source of radiation above said substrate,
   an image means interposed between said substrate and the radiation source whereby gradations form on said substrate in response to characteristics associated with said image means and the source of radiation, providing data on said substrate,
   said substrate embodied as a matrix having a plurality of nodes which are specific with their addresses so that data can subsequently be analyzed.

5. A device for observing phenomena through image casting comprising in combination:
   a radiation sensitive substrate having means to be selectively exposed to a source of radiation above said substrate,
   means for reenergizing said radiation sensitive substrate to refresh/reinitialize said substrate,
   an image means interposed between said substrate and the radiation source whereby gradations form on said substrate in response to characteristics associated with said image means and the source of radiation, providing data on said substrate, said substrate embodied as a matrix having a plurality of nodes which are specific with their addresses so that data can subsequently be analyzed, whereby said reenergizing means periodically charges said matrix nodes to maintain/standardize said data bearing gradations.

6. The device of claim 5 wherein said image means is embodied as a sphere placed above said radiation sensitive substrate, so that a shadow cast by said sphere can be analyzed 7. The device of claim 5 wherein said image means comprises a sphere disposed in a transparent concave dish above said substrate, and said dish containing a viscous liquid which dmapens the rate of roll of said sphere, and a lid on said dish containing said liquid in said concave dish whereby properties of said sphere in said liquid can be observed by said substrate.

8. The device of claim 5 wherein image means is formed as a tube having a closed one end, compressible gas in said tube adjacent to said closed end and an opaque fluid in said tube sealing said gas therein, defining a barometer whereby changes in atmospheric pressure causing said opaque liquid to move closer to said closed end can be sensed on said image sensing substrate.

9. The device of claim 5 wherein said image means includes a magnetically sensitive needle carried within a dampening liquid and housed in a container which is transparent to radiation, said needle opaque to radiation and overlying said substrate to cast a shadow thereon.

10. The device of claim 5 wherein said image means includes a specimen contained on a slide type plate interposed between the radiation source and said substrate.

11. The device of claim 5 wherein said image means is embodied as a vertically extending opaque cylinder carried in a central depressed portion of a concave transparent dish whereby radiation emanating from a source near the horizon can cast a measurable shadow.

12. The device of claim 6 wherein said sphere is placed in a transparent concave dish, said sphere having on its outer surface defined areas of radiation absorption and reflection to alter the image cast on said substrate wherein said sphere is magnetically biased to orient one aspect thereof to magnetic north.

13. The device of claim 5 wherein said iamge means is an opaque mask having at least one aperture allowing radiation to pass therebeyond.

14. The device of claim 13 wherein said mask includes plural apertures and said mask has means to translate said mask over said substrate to selectively stimulate said substrate.

15. The device of claim 5 wherein refraction means are included with said image means to provide further information with respect to the chromaticity of said radiation.

16. A method for discerning physical characteristics of phenomena with a high degree of resolution comprisng the steps of:
providing a radiation sensitive substrate,
superimposing thereupon an object which can form an image on said substrate,
exposing both the object and the substrate to radiation to which the substrate is sensitive thereby creating an image on the substrate specific to the object placed above said substrate, and interpreting the shadow upon said substrate by dividing the substrate into a plurality of specific addresses, each address having information which varies as a function of relative presence or absence of the image cast as well as its gradations and as a function of time,
including refreshing the addresses at discrete time intervals to maintain/reinitialize the substrate and noting the presence of the shadow as a function of time.

17. The method of claim 16 including forming the substrate as a concave dish, placing the object in the concave dish orienting the concave dish such that the object is at an extremity of the concave dish, at an edge thereof, reorienting the concave dish such that the object will migrate to a center of the concave dish due the effect of gravity upon the object, using the image sensitive substrate for monitoring the time and the rate of descent whereby the rate of descent will convert into the elevation of the object with respect to sea level, i.e. altitude.

18. The method of claim 16 including forming the object as a sphere having areas of absorption of radiation and areas of reflection to provide additional information specific to the absorbed and reflected areas.

19. The method of claim 16 including providing the object as an elongate cylinder, placing a liquid therein to expand and contract with variations in barometric pressure.

20. The method of claim 16 including the steps of embodying the object as a mask and providing at least one pin hole through which the radiation passes forming an image on the image sensitive substrate.

21. The method of claim 20 including segregating the substrate in to a plurality of sectors, enlarging the pinhole to form a mask hole and translating the mask so that the mask hole passes over small areas of each sector, receiving distinct image data at each mask hole location, storing image data received by the substrate as a function of mask hole location and analyzing the image at a given substrate sector with greater resolution of detail because of the masking.

22. A diagnostic instrument comprising in combination:
a source of radiation,
an object to be diagnosed placed in the path of the radiation emanating from the source,
and sensing substrate means disposed on a side of the diagnosed object remote from the source of radiation and having a plurality of discrete addresses for providing resolution of the diagnosed object as a function of the degree to which the diagnosed object modifies the radiation received on said sensing substrate means, and means for refreshing-/reinitializing said sensing substrate means and each said address.

23. An apparatus for taking analog type data associated with physical objects and admitting the data photodynamically into a CPU/computer comprising in combination:
a CPU/computer input means configured as random access memory defining a radiation sensitive substrate having specific addresses corresponding to nodes on said substrate and operatively integrated into the CPU/computer,
a source of radiation oriented to contact said substrate with radiation, and an object interposed between said substrate and said radiation, to alter input to said substrate, whereby images on said substrate are directly admitted into the computer and physical data with respect to position, configuration, motion, or derivatives thereof, light characteristics or other phenomena are directly accessible to the CPU/computer and capable of manipulation as any other portion of computer memory.

* * * * *